US005210920A

United States Patent [19]

Manzolati

[11] Patent Number: 5,210,920

[45] Date of Patent: May 18, 1993

[54] APPARATUS AND METHOD FOR PRECISION ASSEMBLY OF PHOTORECEPTOR DRUMS

[75] Inventor: Richard J. Manzolati, Webster, N.Y.

[73] Assignee: Xerox Corporation, Stamford, Conn.

[21] Appl. No.: 751,904

[22] Filed: Aug. 29, 1991

[51] Int. Cl.[5] .......... B23P 19/04

[52] U.S. Cl. .......... 29/281.5; 29/123; 29/243.5; 29/464; 29/773; 492/47

[58] Field of Search .......... 29/243.5, 243.57, 422, 29/464, 455.1, 773, 776, 801, 806, 890.14, 281.5, 281.6, 123; 53/116, 118, 485, 486, 487, 488, 489; 355/211

[56] References Cited

U.S. PATENT DOCUMENTS

| | | | |
|---|---|---|---|
| 1,881,783 | 10/1932 | Mallinckrodt et al. | 53/485 X |
| 1,946,024 | 2/1934 | Lamatsch | 29/123 X |
| 2,019,223 | 10/1935 | Hermani | 29/773 |
| 2,384,324 | 9/1945 | Martin | 29/464 X |
| 2,758,367 | 8/1956 | Dougherty | 29/464 X |
| 3,200,556 | 8/1965 | Ackley | 53/485 |
| 3,802,052 | 4/1974 | Andler et al. | 29/806 X |
| 3,807,022 | 4/1974 | Von Bredow | 29/773 X |
| 4,134,669 | 1/1979 | Reitner | 355/211 X |
| 4,326,793 | 4/1982 | Buholtz | 355/211 X |
| 4,974,316 | 12/1990 | Suzuki et al. | 29/806 |
| 5,074,034 | 12/1991 | Lebbon | 29/773 X |

FOREIGN PATENT DOCUMENTS 1-319782 12/1989 Japan .

*Primary Examiner*—Mark Rosenbaum
*Assistant Examiner*—Peter Dungba Vo
*Attorney, Agent, or Firm*—Finnegan, Henderson, Farabow, Garrett and Dunner

[57] ABSTRACT

Apparatus for precision assembly of photoreceptor drum having a thin-walled hollow tube and at least one end bell, includes an assembly fixture head having a drum collet for uniformly gripping an end of the hollow tube to true its cross-section; a means for defining the extreme distal end of the photoreceptor drum opposite the gripped tube end; an end bell collet for supporting the first end bell concentric with the gripped tube end; and a slidable cylindrical sleeve for selectively positioning the end bell a predetermined axial distance from the extreme distal end of the drum. Further, the apparatus is provided with a means for curing flowable adhesive which is applied between the end bell and the gripped tube end to securely fix the end bell concentric with the cross-section of the hollow tube at the uniform predetermined axial distance from the extreme distal end. The distal end defining means can include a second assembly fixture head for simultaneously mounting first and second end bells at respective ends of the drum, such that the end bells are concentrically secured to the hollow tube at the desired predetermined axial distance from each other.

20 Claims, 6 Drawing Sheets

46
48
36
45
42
43
30
34
82
14
65
62
68
61
64
64
63
72
66
74
12
26
24
DEFINING MEANS

APPARATUS AND METHOD FOR PRECISION ASSEMBLY OF PHOTORECEPTOR DRUMS

BACKGROUND OF THE INVENTION

1. Field of the Invention

The present invention relates to apparatus and methods for precision assembly of photoreceptor drums or the like, particularly drums comprised of thin-walled hollow tubes. In general, the present invention further relates to the concentric, distortion-free mounting of an end piece within an open end of a thin-walled hollow tube.

2. Description of the Prior Art

Reprographic devices, such as photocopiers and laser printers, commonly utilize electrostatic principles to reproduce printed materials. In operation, the image to be printed is generated onto a substrate, such as a rotatable photoreceptor drum, by an electrographic process. Toner material is then applied to the substrate to create the image in visible form, which then is transferred and fixed to paper or similar base material.

Recent advancements in reprographic techniques have resulted in greatly enhanced imaging definition. However, these results are dependent upon the high dimensional accuracy and interaction of the various components which make up the reprographic device. In particular, even minute variations in the rotational alignment or surface evenness of the photoreceptor drum can prove detrimental to the image generation process, making efforts toward improving image resolution futile As such, the dimensional accuracy of the photoreceptor drum is critical to the achievement of the desired imaging definition. The primary indicator of dimensional accuracy of the photoreceptor drum is referred to as Total Indirect Run-out (TIR), which is a measure of the trueness of the drum surface and the centricity of the rotational axis.

To date, a photoreceptor drum or the like, is typically assembled using a hollow, open-ended tube and two end bells; each end bell being generally friction-fitted and glued into a corresponding end of the hollow tube. Each end bell includes a central aperture to receive a central axial shaft for rotatably supporting the assembled photoreceptor drum. As such, the hollow tube and end bells must be precision manufactured within a close dimensional tolerance to enable a snug frictional engagement therebetween.

Two alternative mounting configurations of the hollow tube and end bells are conventionally employed in the assembly of photoreceptor drums. In one configuration, as illustratively shown in FIG. 1, a chamfered mounting surface is included along the inside edge of each open end of the hollow tube to snugly receive an end bell therein. As such, the precision manufacture of the hollow tube and end bells includes cutting the tube to the proper length; machining a mounting surface into each open end of the tube truing the exterior surface of the tube on a lathe; and machining the end bells to be concentrically received by corresponding mounting surfaces.

In order to eliminate the expensive process of machining a mounting surface along the inside edge of the hollow tube, the alternative mounting configuration locates the mounting surface along the peripheral edge of the end bell. That is, the end bell of the alternative conventional configuration has a peripheral edge sized to frictionally engage the inside surface of the hollow tube, and an outwardly extending lip having a diameter greater than the inside diameter of the hollow tube. As the end bell of the second configuration is inserted into an open end of the hollow tube, the peripheral edge of the end bell frictionally engages the inner surface of the hollow tube until the lip prevents further insertion.

In either configuration, however, the hollow tube must be constrained during a majority of the manufacturing process. Thus, distortion of the manufactured tube inherently occurs when the constraints are removed and the tube returns to its unstressed, relaxed condition. Likewise, in either configuration, further distortion of the exterior surface of the hollow tube occurs upon insertion of the end bells into the mounting surfaces, due to the snug frictional engagement and tolerance stack-up between the end bells and the mounting surface of the hollow tube, as seen in FIG. 1. Of course, concerns over dimensional inaccuracies are not limited to the distortion of the substrate surface. Tolerance stack-up between the end bells and the hollow drum inherently result in eccentric alignment of the end bells and non-uniform axial distances between the corresponding end bells.

An additional consideration in the manufacture of photoreceptor drums is cost of production. The precision machining processes typically required for the hollow drum and end bells add extraordinary expenses to the overall assembly cost of the photoreceptor drum. Likewise, while thin-walled hollow tubes are preferred for economic reasons, the first conventional method of assembly discussed above prohibits their use since the thin-walled members cannot adequately be machined to include a mounting surface for the end bells.

SUMMARY OF THE INVENTION

The general object of the invention is to provide a method and apparatus for precision assembly of photoreceptor drums or the like, which is capable of mass producing drums with distortion-free outer peripheral surfaces.

Another object of the invention is to provide a method and apparatus for precision assembly of drums, which is capable of mass producing drums with centrally aligned apertures for precision rotational mounting, as measured by TIR.

An additional object of the invention is to provide a method and apparatus for precision assembly of drums, which is capable of mass producing drums having a uniform predetermined axial length.

Another object of the invention is to provide an economical method and apparatus for precision assembly of drums, which requires no extraneous machining or tooling of individual parts to ensure close tolerance fits.

A further object of the invention is to provide an economical method and apparatus for precision assembly of drums, which can utilize inexpensive thin-walled hollow tubes without requiring special adaptation of its ends.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises an apparatus for precision assembly of a photoreceptor drum or the like, wherein the photoreceptor drum to be assembled has a predetermined axial length and includes a hollow tube and a first end bell of corresponding shape to be concentrically mounted on a first end of the hollow tube. The apparatus of the invention comprises first gripping means for truing and holding the outer peripheral surface of the first end of the hollow tube; defining means for identifying an extreme distal end of the photoreceptor drum opposite the first end of the hollow tube; first supporting means cooperating with the first gripping means for supporting the first end bell concentric with the first end of the hollow tube; and first positioning means cooperating with the first supporting means and the defining means for selectively positioning the first end bell supported by the first supporting means at the predetermined axial distance from the extreme distal end of the photoreceptor drum, as determined by the defining means.

If a second end bell is required on the opposite end of the hollow tube, then the defining means of the apparatus preferably comprises second gripping means for truing and holding the outer peripheral surface of a second end of the hollow tube; second supporting means cooperating with the second gripping means for supporting the second end bell concentric with the second end of the hollow tube; and second positioning means cooperating with the second supporting means and the first positioning means for selectively positioning the second end bell at the predetermined axial distance from the first end bell to maintain the predetermined axial length of the photoreceptor drum.

As further embodied and broadly described herein, the method for precision assembly of a photoreceptor drum or the like, comprises the steps of gripping the outer peripheral surface of the first end of the hollow tube with sufficient uniform force to true the cross-section of the hollow tube; defining an extreme distal end of the photoreceptor drum opposite the first end of the hollow tube; supporting the first end bell concentric with the first end of the hollow tube; positioning the first end bell at the predetermined axial distance from the extreme distal end of the photoreceptor drum; and fixing the first end bell to the first end while the first end bell is held concentric with the cross-section of the hollow tube at the predetermined axial distance from the extreme distal end. Likewise, if a second end bell is to be mounted on the hollow tube, the step of defining the extreme distal end of the photoreceptor drum preferably comprises the steps of gripping the outer peripheral surface of the second end of the hollow tube with sufficient uniform force to true the cross-section of the hollow tube; supporting the second end bell concentric with the second end of the hollow tube; positioning the second end bell at the predetermined axial distance from the first end bell; and fixing the second end bell to the second end of the hollow tube while the second end bell is held concentric with the cross-section of the hollow tube at the predetermined axial distance from the first end bell.

In the preferred embodiment of the invention, flowable attaching means is applied to the first and second ends of the hollow tube prior to mounting of the first and second end bells thereon. Respectively, the apparatus 20 further has means for curing the flowable attaching means while the first and second end bells are held concentric with the cross-section of the hollow tube by the first and second supporting means, and spaced the predetermined axial distance apart by the first and second positioning means.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the invention and together with the description, serve to explain the principles of the invention.

BRIEF DESCRIPTION OF THE DRAWINGS

FIG. 5(*b*) is a cross sectional view of the invention, which shows the assembly fixture head fully retracted after loading of an end bell.

FIG. 5(*c*) is a cross sectional view of the invention, which shows the assembly fixture head fully extended prior to gripping a hollow tube.

FIG. 5(*d*) is a cross sectional view of the invention, which shows the assembly fixture head fully extended after gripping a hollow tube.

FIG. 5(*e*) is a cross sectional view of the invention, which shows the assembly fixture head fully extended after positioning the end bell at a predetermined axial location.

DESCRIPTION OF THE PREFERRED EMBODIMENT

Reference will now be made in detail to the present preferred embodiment of the invention, an example of which is illustrated in the accompanying drawings. Wherever possible, the same reference numbers will be used throughout the drawings to refer to the same or like parts.

The Photoreceptor Drum

Figure 1:
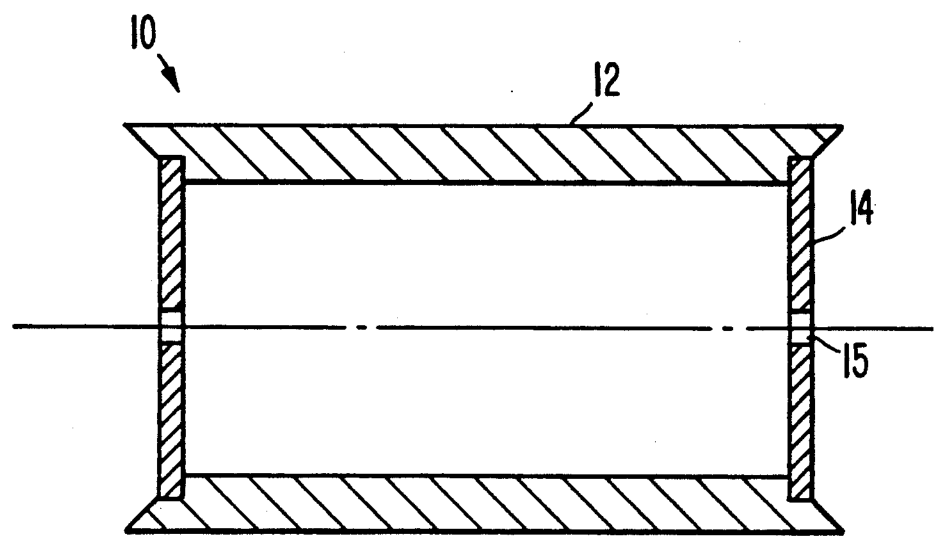
FIG. 1 is a cross sectional view of a representative embodiment of one configuration of a photoreceptor drum assembled by the prior art, which shows the hollow tube being distorted by the conventional mounting of the end bells.
Figure 2:
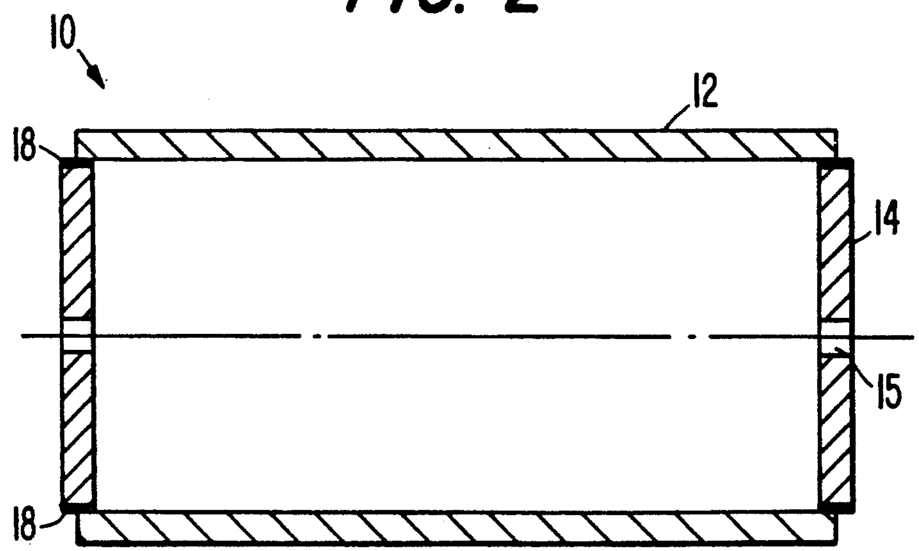
FIG. 2 is a sectional view of a representative embodiment of a photoreceptor drum assembled by the apparatus and method of the present invention.

The photoreceptor drum 10 to be assembled by the apparatus 20 of the present invention is comprised of a hollow tube 12 and at least one end bell 14 to be mounted on an open end of the hollow tube 12. As seen in FIG. 2, the end bell 14 corresponds to the cross-section of the hollow tube 12, and includes an aperture 15 passing through its axial center. Once mounted, the end bell 14 provides a means for rotatably supporting the hollow tube 12 upon a central axial shaft. In the preferred embodiment of the present invention, the drum 10 to be assembled utilizes a thin-walled, elongated, cylindrical hollow tube 12 having a circular cross-section and a longitudinally-extending central axis.

Typically a photoreceptor drum 10 includes two end bells 14, one mounted at either end of the hollow tube 12. Accordingly, but for illustrative purposes only, the preferred embodiment of the apparatus 20 discussed herein is configured for the assembly of photoreceptor drums 10 having two end bells 14. However, it should be understood that the apparatus 20 of the present invention is equally capable of assembling photoreceptor drums 10 which only require a single end bell 14. Such would be the case if the hollow tube 12 were formed with an integral closed end by force drawn method or the like. It is further noted that the apparatus 20 of the present invention is not limited to the assembly of photoreceptor drums 10; but rather, the present invention may be used in the assembly of any object comprised of a hollow tube and at least one end bell.

The Method

In accordance with the invention, the method for precision assembly of a photoreceptor drum 10 or the like, comprises a series of steps to ensure the end bell 14 and the hollow tube 12 are properly positioned in concentric axial alignment with each other. Further, the method of the present invention enables the end bell 14 to be accurately mounted at a predetermined axial distance from an extreme distal end of the hollow tube 12, such that the assembled photoreceptor drum 10 has a predetermined axial length uniform with that of another photoreceptor drum assembled by the same method.

The method steps of the present invention required for the assembly the photoreceptor drum 10, as indicated, include (1) gripping the outer peripheral surface 13 of an end of the hollow tube 12 with sufficient uniform force to true the cross-section of the hollow tube 12; (2) defining an extreme distal end of the photoreceptor drum 10 opposite the gripped end of the hollow tube 12; (3) supporting the end bell 14 concentric with the gripped end of the hollow tube 12; (4) positioning the end bell 14 at the desired predetermined axial distance from the extreme distal end of the photoreceptor drum 10; and (5) securely fixing the end bell 14 to the gripped end while the end bell 14 is held concentric with the cross-section of the hollow tube 12 at the predetermined axial distance from the extreme distal end, such that the concentric alignment of the end bell 14 with the trued cross-section of the hollow tube 12 and the predetermined length of the assembled drum 10 are maintained.

In the preferred embodiment of the invention, a flowable adhesive 18 is used to affix the end bell 14 to the hollow tube 12 such that the fixing step is actually performed in two separate steps. The first of these two steps is to apply the flowable adhesive 18 along the inside edge of the open end of the hollow tube 12. This may be performed prior to gripping the end of the hollow tube 12, as in the preferred embodiment discussed herein, or after the end bell 14 has been aligned and positioned for mounting. The second step, then, is to cure the flowable adhesive 18 so as to affix the end bell 14 concentric with the cross-section of the hollow tube 12 and at the predetermined axial distance from the opposite extreme distal end.

While various mechanisms may be used to accomplish the steps of the invention, those of the preferred embodiment are discussed in detail below. It is important to note, however, that in order to ensure precision accuracy in assembling the drum 10, it is beneficial to incorporate the separate mechanisms used for the various steps into a single apparatus 20. Finely-tuned alignment and placement of the end bell 14 relative the hollow tube 12 is essential for proper assembly. By integrating the mechanisms required to perform the various steps of the assembly method into a single apparatus 20, this high degree of precision can be easily maintained.

Further, when two end bells 14 must be mounted on a hollow tube 12, as in the drum 10 assembled by the preferred embodiment, the two end bells 14 are to be mounted in cooperation with each other. That is, the steps of the assembly method are performed on the second end of the hollow tube 12 simultaneous to the steps performed on the first end of the hollow tube 12.

The Apparatus

In accordance with the present invention, the apparatus includes gripping means for truing and holding the outer peripheral surface 13 of at leas one end of the hollow tube 12; defining means for identifying the extreme distal end of the drum 10 opposite the end bell 14 to be mounted; supporting means for supporting an end bell 14 concentric with the corresponding end being gripped; and positioning means for selectively positioning the end bell 14 supported by the supporting means at a predetermined axial distance from the opposite extreme distal end.

Figure 3:
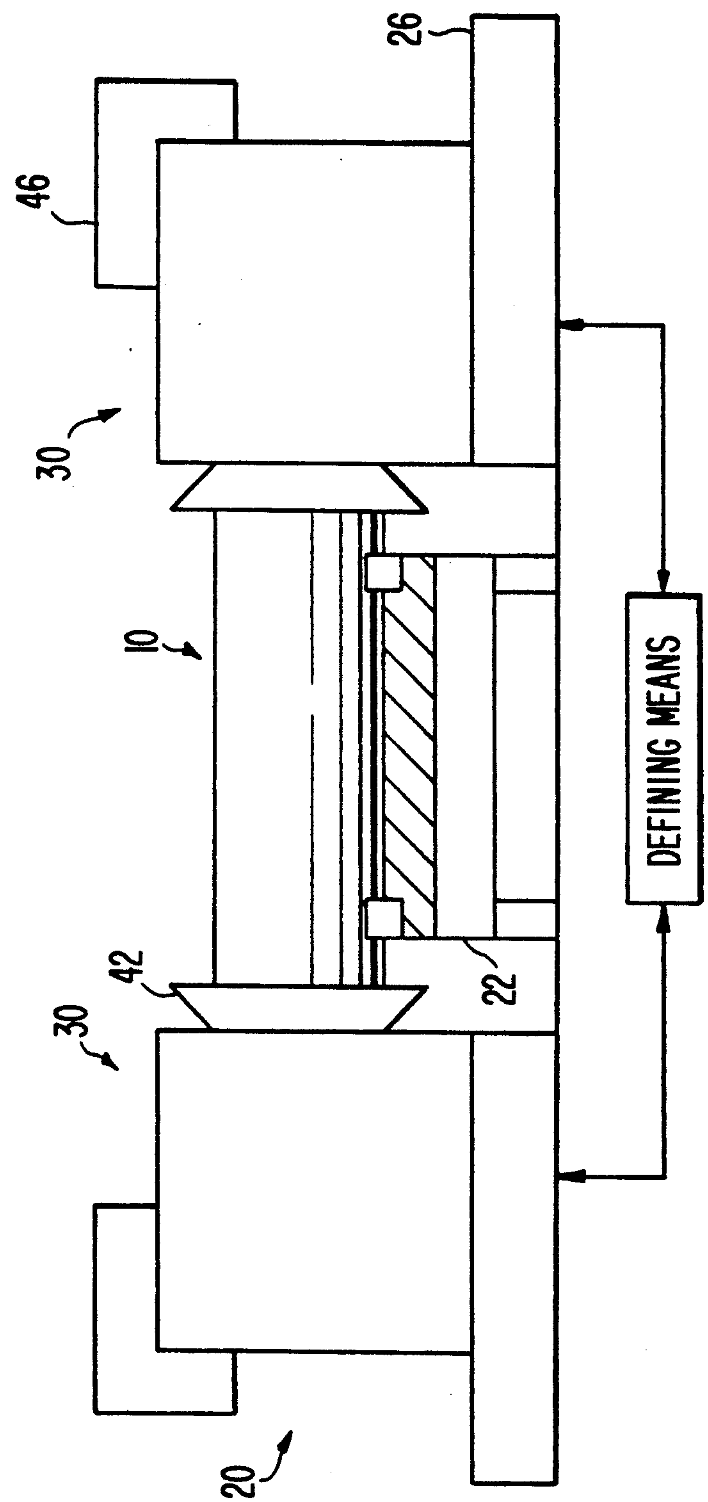
FIG. 3 is a side view of the apparatus of the invention in the process of assembling a photoreceptor drum, the apparatus being shown in combination with a tube conveyor.

As embodied herein and as best seen in FIG. 3, the apparatus 20 is generally comprised of identical assembly fixture heads 30, the number of assembly fixture heads 30 utilized being dependent upon the number of end bells 14 to be mounted on a hollow tube 12. If only one end bell 14 is to be mounted on a hollow tube 12, then only one assembly fixture head 30 is required. Similarly, if the drum 10 to be assembled requires two end bells 14, as with that of the preferred embodiment, then the apparatus 20 of the present invention utilizes two identical assembly fixture heads 30. The two identical assembly fixture heads 30 are spaced apart and facing each other with the hollow tube 12 of the drum 10 to be assembled lying between them.

In the preferred embodiment of the present invention, the apparatus 20 is integrated with a fully-automated assembly system. FIG. 3 shows the apparatus 20 of the present invention cooperating with a conveyor system 22 which moves hollow tubes 12 into position for subsequent assembly. It is noted that the apparatus 20 of the preferred embodiment illustrated in FIG. 3 utilizes two identical assembly fixture heads 30. However, since the assembly fixture heads 30 are identical, and since only one assembly fixture head 30 may be required in an alternative embodiment of the apparatus 20, only the elements of one assembly fixture head 30 need be discussed in detail below.

In accordance with the present invention, each assembly fixture head 30 includes gripping means for truing and holding the outer peripheral surface 13 of a corresponding end of the hollow tube 12; defining means for identifying the extreme distal end of the drum 10 opposite the end bell 14; supporting means for supporting an end bell 14 concentric with the corresponding end being gripped; and positioning means for selectively positioning the end bell 14 supported by the supporting means at a predetermined axial distance from the opposite extreme distal end.

The gripping means of the present invention serves two functions. First, the gripping means securely engages a corresponding end of the hollow tube 12 to hold and maintain the hollow tube 12 in a horizontally-aligned position. Second, the gripping means trues or shapes the cross-section of the hollow tube 12 to minimize any slight inaccuracies which might exist along the outer peripheral surface 13 of the hollow tube 12.

Figure 4:
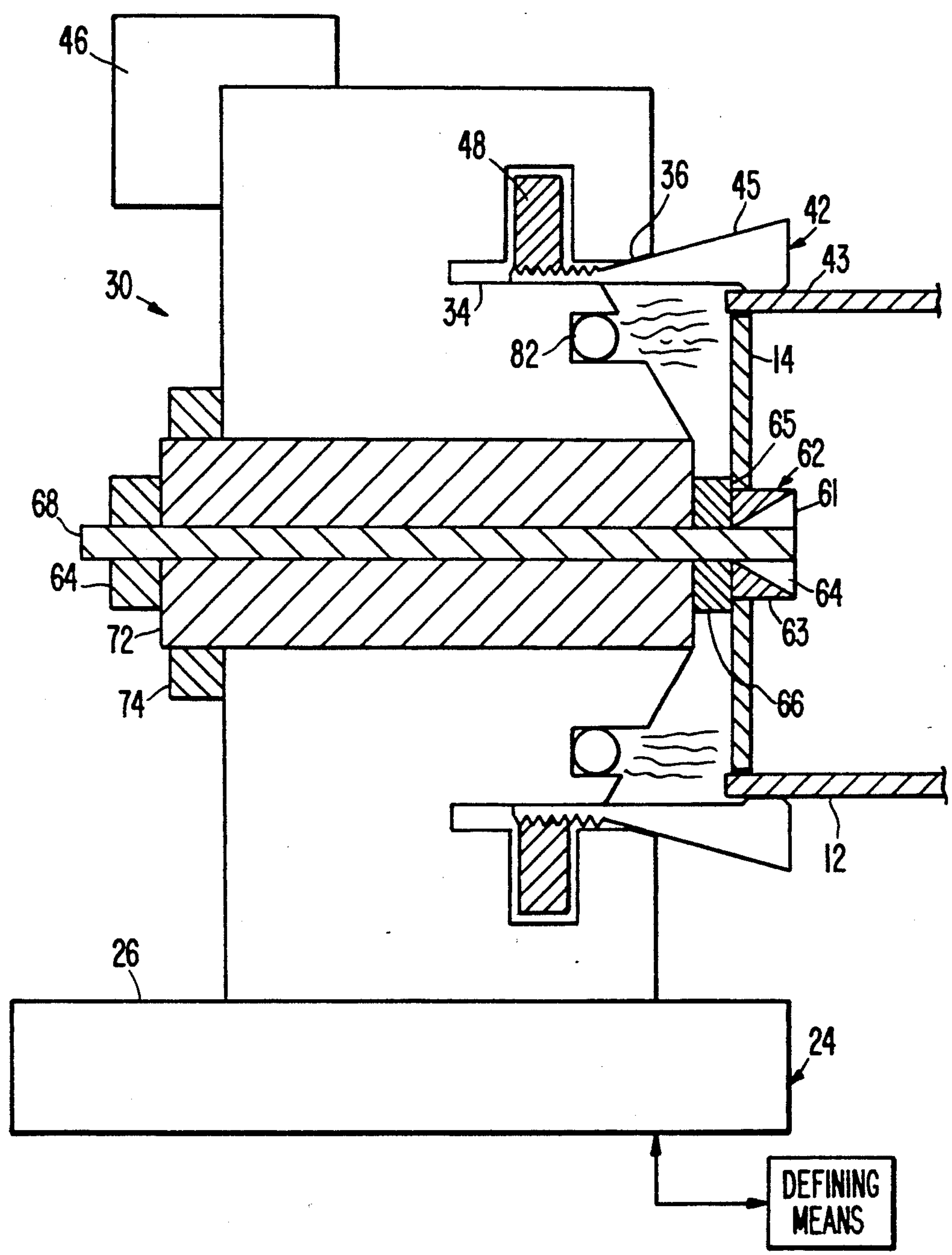
FIG. 4 is an enlarged cross sectional view of an assembly fixture head of the invention, which shows the basic working components of the invention.
Figure 5A:
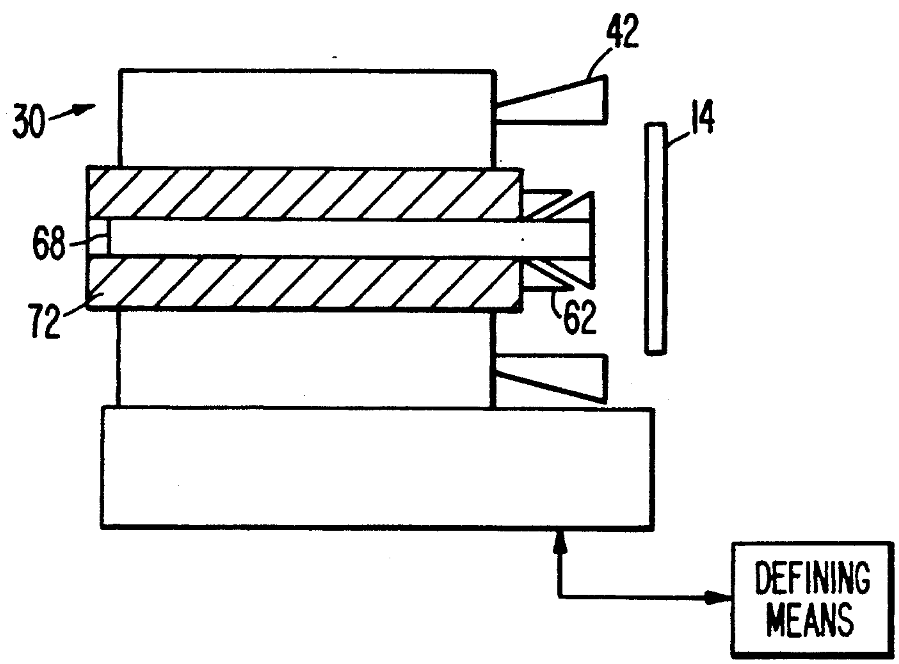
FIG. 5(*a*) is a cross sectional view of the invention, which shows the assembly fixture head fully retracted prior to loading of an end bell.
Figure 5B:
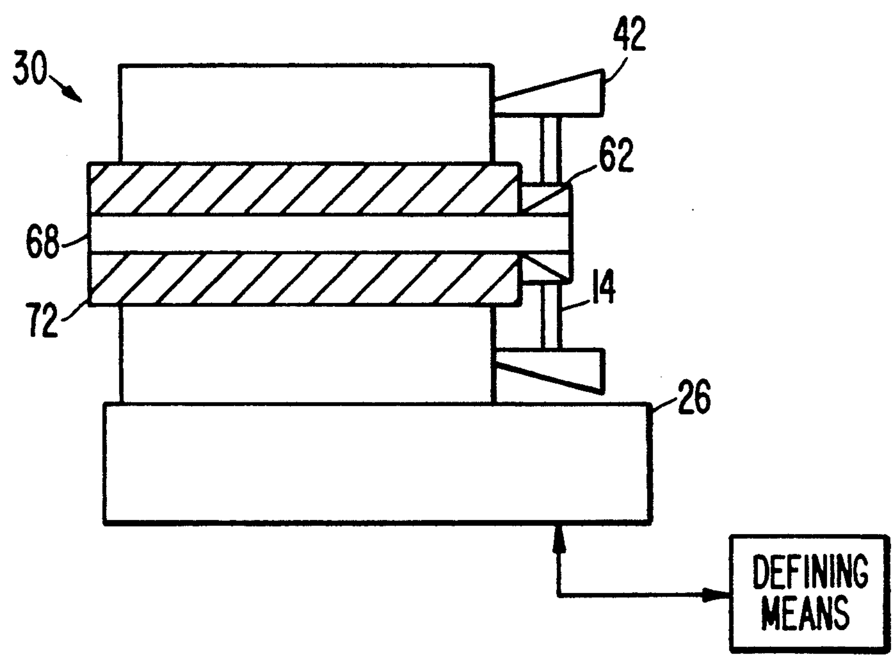
Figure 5C:
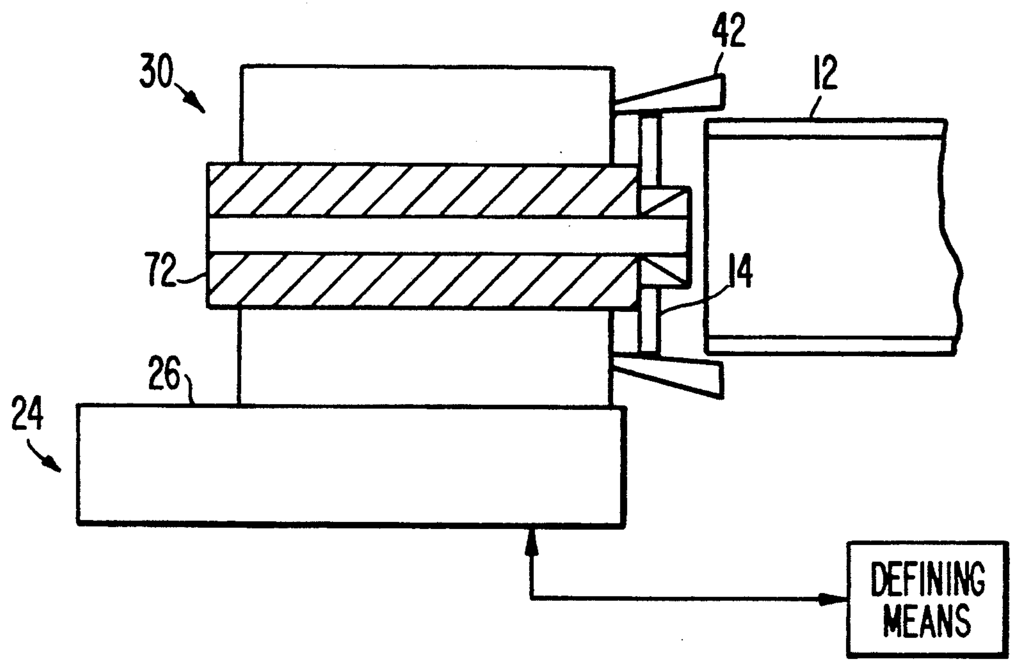
Figure 5D:
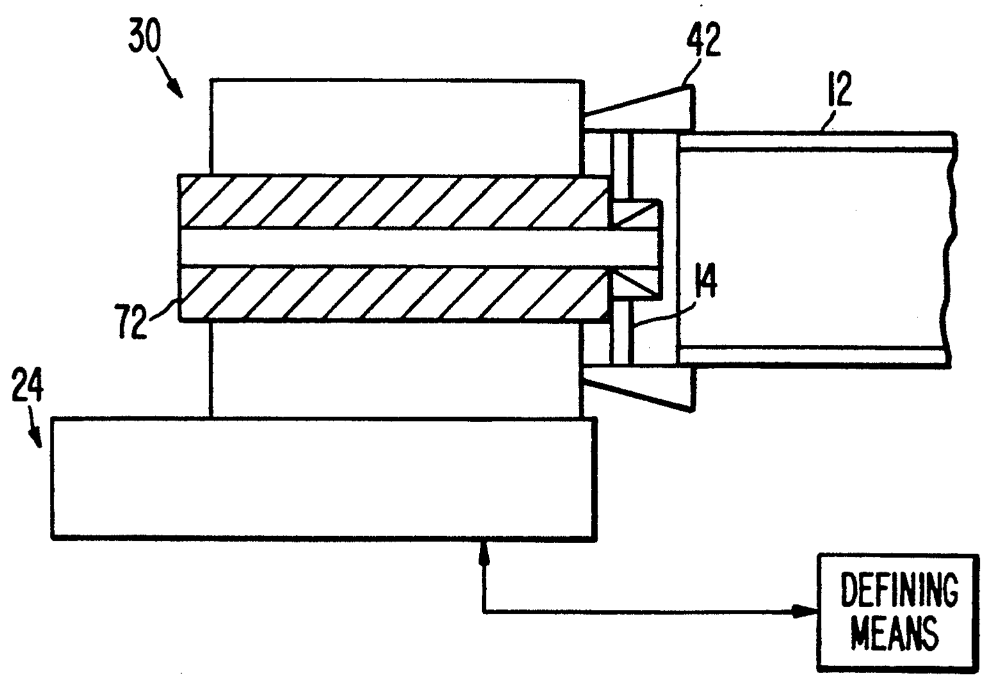
Figure 5E:
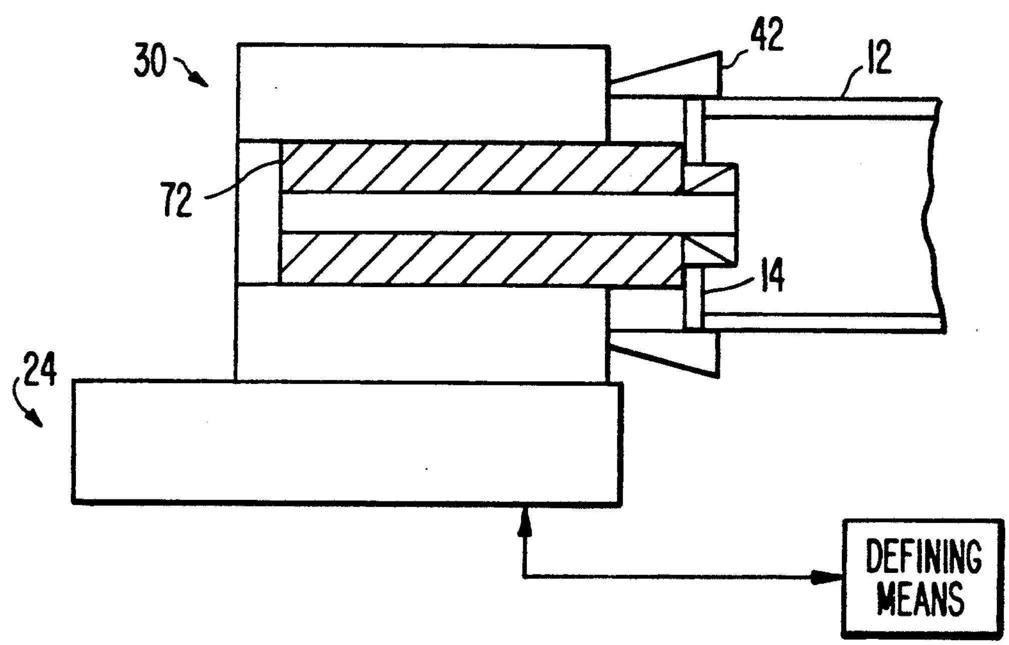

To effectively perform both functions, the gripping means must evenly engage the entire outer peripheral surface 13 of the hollow tube 12. In the preferred embodiment, this high degree of uniformity is provided by using a drum collet 42 which completely surrounds the outer peripheral surface 13 of the corresponding end of the hollow tube 12. As illustrated in FIG. 4 by way of example and not limitation, the drum collet 42 is generally cylindrical with an interior gripping surface 43 and conically-shaped exterior camming surface.

To facilitate gripping, the assembly fixture head 30 has a chamber 34 defined in its front surface 32. The chamber 34 is sized to receive the drum collet 42 and includes a conically-shaped interior camming surface 36 adapted to matingly engage the exterior engaging surface 45 of the drum collet 42. Also included on the assembly fixture head 30 is drive means for selectively engaging the drum collet 42 with the interior camming surface 36 of the chamber 34. The drive means draws the drum collet 42 into the chamber 34, forcing the interior camming surface 36 of the chamber 34 against the exterior engaging surface 45 of the drum collet 42. In the preferred embodiment, the drive means is a motor 46 and gearing mechanism 48, such as a worm gear, cooperating with a corresponding gearing mechanism on the drum collet 42.

The interaction between the interior camming surface 36 and the exterior engaging surface 45 forces the drum collet 42 to uniformly compress, such that the interior gripping surface 43 engages the outer peripheral surface 13 of the hollow tube 12. As a result of its simple design and high accuracy, the drum collet 42 effectively trues the cross-section of the hollow tube 12 and secures the hollow tube 12 in an axially-aligned position for subsequent mounting of the end bell 14. The general operation of the gripping means of the preferred embodiment is demonstrated in FIGS. 5(*c*) and 5(*d*).

To facilitate uniform compression, the drum collet 42 of the preferred embodiment includes a series of longitudinal slits evenly spaced about its circumference. The slits extend inwardly from the outermost end of the collet, and are of sufficient length to permit slight deflection of the cantilevered member defined between two adjacent slits. Alternatively, the drum collet 42 may be formed from a stiff material which is resilient enough to yield slightly to the pressure induced by the interior camming surface 36 interacting with the exterior engaging surface 45.

As best seen for illustrative purposes in FIGS. 5(*b*) and 5(*c*), the preferred embodiment of the present invention includes base means 24 onto which the assembly fixture head 30 is movably mounted. In operation, the assembly fixture head 30 is thus extendable to enable gripping of a corresponding end of the hollow tube 12, and retractable to permit release of the hollow tube 12 and placement of subsequent hollow tubes 12 for assembly. The apparatus 20 of the preferred embodiment utilizes a slide mechanism 26 for extended and retracted movement; however any similar mechanical expedient may likewise be used.

In accordance with the invention, the defining means of the present invention identifies the axial location of the extreme distal end of the photoreceptor drum 10, opposite the end to which the end bell 14 is to be mounted. To ensure a predetermined axial length for the photoreceptor drum 10, the end bell 14 must be positioned at the predetermined axial distance from the extreme distal end identified by the defining means. As such, the defining means is in fact determinative of the axial location at which the end bell 14 must be held for mounting.

In the event that only one assembly fixture head 30 is required, such as when a single end bell 14 is to be mounted on a hollow tube 12 having an integral closed end opposite the end bell 14, the defining means may comprise a linear transducer or similar location measurement device (not shown). The defining means identifies the axial location of the extreme distal end opposite the end bell 14, such as the integral closed end in the illustrative example above, and cooperates with the positioning means of the assembly fixture head 30 to adjust the mounting location of the end bell 14, accordingly.

When two identical assembly fixture heads 30 are used together, as in the preferred embodiment discussed herein, one assembly fixture head 30 acts as the defining means for the other. That is, the positioning of one end bell 14 is interrelated with the positioning of the other end bell, such that the predetermined axial distance between the two end bells 14 is maintained. This may best be accomplished by presetting and finely tuning the axial movement of the assembly fixture head 30 and the positioning means, described in detail below, to ensure the precise location of one end bell 14 relative the other. Of course alternative means may be used, such as location measurement devices and iterative computerized adjustments.

In accordance with the invention, the supporting means of the present invention must securely hold the end bell 14 concentric with the cross-section of the hollow tube 12. In order to ensure precision mounting, the axis projecting perpendicularly through the center of the end bell 14 must be axially aligned with the longitudinal axis extending through the center of the hollow tube 12. This is best accomplished by aligning the supporting means both concentrically and axially with the gripping means.

As illustrated in FIG. 4 by way of example and not limitation, the supporting means of the preferred embodiment comprises an actuating member 61 which is substantially conical in shape; a cylindrically-shaped end bell collet 62 having an outer support surface 63 corresponding to the central aperture 15 of the end bell 14, and an inner camming surface 64 adapted to receive the actuating member 61; and an actuating means for selectively engaging the actuating member 61 with the inner camming surface 64 of the end bell collet 62.

In operation, the actuating member 61, as initiated by the actuating means, is received by and contacts the inner camming surface 64 of the end bell collet 62. As the actuating means further engages the actuating member 61 with the inner camming surface 64, the outer support surface 63 of the end bell collet 62 uniformly expands into engagement with the central aperture 15 of the end bell 14. The uniform expansion of the outer support surface 63 of the end bell collet 62 inherently aligns the central axis of the end bell 14 with that of the hollow tube 12 due to the arrangement of the supporting means relative the gripping means. As with the drum collet 42, the uniform expansion of the end bell collet 62 may be facilitated by evenly spacing slits around the periphery of the end bell collet 62, or by forming the end bell collet 62 from a slightly resilient material.

While various actuating means may be utilized, FIG. 4 shows the actuating means of the preferred embodiment comprising a shaft 68 fixed to and extending from the actuating member 61, wherein the shaft 68 is slidably mounted and extending through the axial center of the end bell collet 62 and the gripping means. By configuring the actuating means as such, the actuating member 61 is certain to be flush with the inner camming surface 64 of the end bell collet 62 for uniform expansion of the outer support surface 63. FIG. 4 further shows an actuating solenoid 69 cooperating with the shaft 68 to effectively shift the actuating member 61 into and out of engagement with the end bell collet 62. FIGS. 5(*a*) and 5(*b*) demonstrate the general operation of the supporting means of the preferred embodiment.

The precise axial location of the end bell is a function of the positioning means and the placement of the end bell 14 on the end bell collet 62. In the preferred embodiment of the present invention, and as best seen in FIG. 4, the end bell collet 62 includes a peripheral lip 65 or stop surface having a diameter greater than that of the outer support surface 63. When placed on the end bell collet 62, the end bell 14 is slid back along the length of the end bell collet 62 until it abuts the peripheral lip 65. In this manner, the precise placement of the end bell 14 on the end bell collet 62 is known, and the positioning means can operate accordingly. Of course, alternative methods may be used to determine the exact placement of the end bell 14 on the end bell collet 62, including the use of location measurement devices which, in turn, must cooperate with the positioning means.

In accordance with the invention, the positioning means of the present invention ensures a uniform overall length for each assembled drum 10, by positioning and maintaining the end bell 14 at a predetermined axial location until the end bell 14 can be securely fixed to the hollow tube 12. The positioning means cooperates with the supporting means and the defining means to determine the precise axial location at which the end bell 14 must be held relative the opposing extreme distal end of the drum 10.

The positioning means of the preferred embodiment comprises a cylindrical sleeve 72 through which the supporting means extends, as illustrated in FIG. 4. The cylindrical sleeve 72 is concentrically aligned with the gripping means, and slidably mounted to enable positioning of the end bell 14 along the central axis of the hollow tube 12. More specifically, the end bell collet 62 of the preferred embodiment is located at one end of the cylindrical sleeve 72 with the shaft 68 slidably extending through the sleeve's axial center. Once the shaft 68 is actuated to securely engage the end bell 14 on the end bell collet 62, the cylindrical sleeve 72 may slide freely along the central axis of the hollow tube 12 with the end bell 14 held securely at a known location on an end thereof.

While a variety of means may be utilized for slidably moving the cylindrical sleeve 72 into proper position, the preferred embodiment provides for a positioning solenoid 74. The positioning solenoid 74 cooperates with the defining means to slide the cylindrical sleeve 72 along the central axis of the hollow tube 12 until the end bell 14 is a predetermined axial distance from the extreme distal end identified by the defining means. When two assembly fixture heads 30 are used in conjunction, the positioning means of one assembly fixture head 30 cooperates with that of the other to ensure the predetermined axial length is maintained. As mentioned above, this may be accomplished by presetting the automated mechanical movement of the assembly fixture heads 30 and corresponding positioning means, or by utilizing location measurement devices and iterative computerized adjustments. The general operation of the positioning means of the preferred embodiment is best seen in FIGS. 5(*d*) and 5(*e*).

Once properly positioned, the end bell 14 can then b securely fixed to the hollow tube 12. For best results, it is suggested that a flowable adhesive 18 be applied symmetrically along the inside edge of the open end prior to positioning of the end bell 14. With the open end of the hollow tube 12 trued by the gripping means, and the corresponding end bell 14 held concentric with the cross-section of the hollow tube 12 by the supporting means and spaced the appropriate predetermined distance from the opposite distal end by the positioning means, the flowable adhesive 18 fills any existing gaps between the hollow tube 12 and the end bells to securely affix the two together in the precise position established by the apparatus 20. The symmetrical application of the flowable adhesive 18 will ensure no asymmetric distortion occurs upon release of the gripping means and the supporting means.

As opposed to simply holding the end bell 14 in position until the adhesive 18 cures on its own, and further in accordance with the invention, the assembly fixture head 30 of the preferred embodiment includes a means 82 for curing the flowable adhesive 18. In this manner, the end bell 14 is certain to be secured to the hollow tube 12 prior to release by the apparatus 20, so that no subsequent distortion of the hollow tube 12 or displacement of the end bell 14 occurs while the adhesive 18 is in its curing stage. The curing means 82 used dependents on the type of adhesive 18 applied, but could include ultraviolet lights, hot air jets, or induction heatable adhesive. Alternatively, the assembly fixture head 30 could include a means for directly applying a quick-curing adhesive 18 or the like while the end bell 14 is held in position relative the hollow tube 12, such that no additional curing means is required.

Of course, precision assembly of the photoreceptor drum 10 is not complete until the assembly fixture head 30 has actually released the end bell 14 and hollow tube 12. Generally, the process of releasing the end bell 14 and hollow tube 12 is simply the reverse of the assembly process. That is, the supporting means disengages from the central aperture 15 of the end bell 14; the positioning means withdraws the supporting means from the end bell 14; the gripping means disengages from the outer peripheral surface 13 of the hollow tube 12; and the assembly fixture head 30 retracts to release the assembled photoreceptor drum 10 and permit a new hollow tube to be moved into position for subsequent assembly.

To further facilitate easy withdrawal of the end bell collet 62 from the central aperture 15 of the end bell 14, a stripper spring 66 may be provided. In the preferred embodiment of the present invention, the stripper spring 66 is positioned around the periphery of the end bell collet 62, such that when an end bell 14 is loaded onto the end bell collet 62, the stripper spring 66 is held slightly compressed between the end bell 14 and the cylindrical sleeve 72 of the position means. Upon disengagement of the supporting means, the stripper spring 66 gently urges the end bell 14 off the end bell collet 62 as the end bell collet 62 is withdrawn from the central aperture 15 by the positioning means. As such, the fixed position of the end bell 14 is not inadvertently shifted during withdrawal of the end bell collet 62 due to accidental frictional engagement of the end bell 14 with the supporting means.

It will be apparent to those skilled in the art that various modifications and variations could be made in the mechanical components used to perform the steps of the assembly method and in the construction of the apparatus of the present invention without departing from the scope or spirit of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An apparatus for precision assembly of a drum, such as a photoreceptor drum, wherein the drum to be assembled has a predetermined axial length and includes a hollow tube and a first end bell of corresponding shape to be concentrically mounted on a first end of the hollow tube, the apparatus comprising:

first gripping means for truing and holding the outer peripheral surface of said first end of the hollow tube;

means for locating a reference location representing an extreme distal end of the drum to be assembled opposite said first end of the hollow tube;

first supporting means cooperating with said first gripping means for supporting the first end bell concentric with said first end of the hollow tube; and first positioning means cooperating with said first supporting means and said locating means for selectively positioning the first end bell supported by said first supporting means at said predetermined axial length from said reference location.

2. The apparatus of claim 1, wherein said first gripping means comprises a first assembly fixture head having a front surface with a first chamber defined therein, the first chamber having an interior camming surface; a first drum collet having an interior gripping surface and an exterior engaging surface adapted to matingly engage the interior camming surface of the first chamber, the first drum collet being receivable within the first chamber; and first drive means selectively engaging the first drum collet with the interior camming surface of the first chamber to compress the interior gripping surface of the first drum collet and effectively true and grip the outer peripheral surface of said first end of the hollow tube inserted therein.

3. The apparatus of claim 2 further comprising base means, wherein the first assembly fixture head is movably mounted on said base means with the first assembly fixture head extendable to enable the drum collet to grip said first end of the hollow tube and retractable to permit release of the hollow tube.

4. The apparatus of claim 2, wherein flowable attaching means is applied to said first end of the hollow tube prior to mounting of the first end bell thereon; and the first assembly fixture head further having means for curing said flowable attaching means while the first end bell is held concentric with the cross-section of the hollow tube by said supporting means, and at said predetermined axial length relative said reference location by said positioning means.

5. The apparatus of claim 1, wherein the first end bell has a central aperture extending therethrough; and said first supporting means comprises a first actuating member with corresponding first actuating means, and a first end bell collet with an outer support surface corresponding to said central aperture and an inner camming surface adapted to receive the first actuating member, said first actuating means selectively engaging the first actuating member with said inner camming surface to expand the outer support surface of the first end bell collet into engagement with the said central aperture.

6. The apparatus of claim 5, wherein said first actuating means comprises a first shaft fixed to and extending from the first actuating member, the first shaft being slidably mounted and extending through the axial center of both the first end bell collet and said first gripping means to concentrically align the first end bell with the cross-section of the hollow tube; and a first actuating solenoid cooperating with the first shaft to selectively engage and disengage the first actuating member with the first end bell collet.

7. The apparatus of claim 6, wherein said first positioning means includes an independently slidable first sleeve through which the first shaft is slidably mounted, the first sleeve being concentric with said first gripping means and cooperating with said locating means to selectively position the axial location of the first end bell relative said reference location.

8. The apparatus of claim 1, wherein said locating means comprises:

second gripping means for truing and holding the outer peripheral surface of a second end of the hollow tube;

second supporting means cooperating with said second gripping means for supporting the second end bell concentric with said second end of the hollow tube; and second positioning means cooperating with said second supporting means and said first positioning means for selectively positioning the second end bell at said reference location to maintain said predetermined axial length of the photoreceptor drum to be assembled.

9. The apparatus of claim 8, wherein the first end bell and the second end bell each has a central aperture extending therethrough;

said first supporting means comprising a first actuating member with corresponding first actuating means, and a first end bell collet with an outer support surface corresponding to the central aperture of the first end bell and an inner camming surface adapted to receive the first actuating member, said first actuating means selectively engaging the first actuating member with said inner camming surface to expand the outer support surface of the first end bell collet into engagement with the central aperture of the first end bell; and said second supporting means comprising a second actuating member with corresponding second actuating means, and a second end bell collet with an outer support surface corresponding to the central aperture of the second end bell and an inner camming surface adapted to receive the second actuating member, said second actuating means selectively engaging the second actuating member with said inner camming surface to expand the outer support surface of the second end bell collet into engagement with the central aperture of the second end bell.

10. The apparatus of claim 9, wherein said first actuating means comprises a first shaft fixed to and extending from the first actuating member, the first shaft being slidably mounted and extending through the axial center of both the first end bell collet and said first gripping means to concentrically align the first end bell with the cross-section of the hollow tube; and a first actuating solenoid cooperating with the first shaft to selectively engage and disengage the first actuating member with the first end bell collet; and said second actuating means comprises a second shaft fixed to and extending from the second actuating member, the second shaft being slidably mounted and extending through the axial center of both the second end bell collet and said second gripping means to concentrically align the second end bell with the cross-section of the hollow tube; and a second actuating solenoid cooperating with the second shaft to selectively engage and disengage the second actuating member with the second end bell collet.

11. The apparatus of claim 10, wherein said first positioning means includes an independently slidable first sleeve through which the first shaft is slidably mounted, the first sleeve being concentric with said first gripping means and cooperating with the second positioning means to selectively position the first end bell at said predetermined length relative the second end bell; and said second positioning means includes an independently slidable second sleeve through which the second shaft is slidably mounted, the second sleeve being concentric and cooperating with said second gripping means to position the second end bell adjacent said second end of the hollow tube, said second positioning means further cooperating with said first positioning means to selectively position the axial location of the second end bell relative said first end bell to maintain said predetermined axial length therebetween.

12. The apparatus of claim 11, wherein said first gripping means comprises a first assembly fixture head having a front surface with a first chamber defined therein, the first chamber having an interior camming surface; a first drum collet having an interior gripping surface and an exterior engaging surface adapted to matingly engage the interior camming surface of the first chamber, the first drum collet being receivable within the first chamber; and first drive means selectively engaging the first drum collet with the interior camming surface of the first chamber to compress the interior gripping surface of the first drum collet and effectively true and grip the outer peripheral surface of said first end of the hollow tube inserted therein;

said second gripping means comprises a second assembly fixture head having a front surface with a second chamber defined therein, the second chamber having an interior camming surface; a second drum collet having an interior gripping surface and an exterior engaging surface adapted to matingly engage the interior camming surface of the second chamber, the second drum collet being receivable within the second chamber; and second drive means selectively engaging the second drum collet with the interior camming surface of the second chamber to compress the interior gripping surface of the second drum collet and effectively true and grip the outer peripheral surface of said second end of the hollow tube inserted therein;

said first and second gripping means being concentrically arranged at respective ends of the hollow tube with the front surface of the first assembly fixture head facing the front surface of the second assembly fixture head.

13. The apparatus of claim 12 further comprising base means, wherein the first and second assembly fixture heads are movably mounted on said base means with the first and second assembly fixture heads centered on the same axis and extendable to enable the first and second drum collets to grip said first end and said second end of the hollow tube respectively, and retractable to permit release of the hollow tube.

14. The apparatus of claim 12, wherein flowable attaching means is applied to said first and second ends of the hollow tube prior to mounting of the first and second end bells thereon; and the first and second assembly fixture heads each further having means for curing said flowable attaching means while the first and second end bells are held concentric with the cross-section of the hollow tube by said first and second supporting means, respectively, and spaced said predetermined axial length apart by said first and second positioning means.

15. An apparatus for precision assembly of a drum, such as a photoreceptor drum, wherein the drum to be assembled includes a hollow tube and a first end bell of corresponding shape to be concentrically mounted on a first end of the hollow tube, the apparatus comprising:

first gripping means for truing and holding the outer peripheral surface of said first end of the hollow tube, said first gripping means comprising a first assembly fixture head having a front surface with a first chamber defined therein, the first chamber having an interior camming surface; a first drum collet having an interior gripping surface and an exterior engaging surface adapted to matingly engage the interior camming surface of the first chamber, the first drum collet being receivable within the first chamber; and first drive means selectively engaging the first drum collet with the interior camming surface of the first chamber to compress the interior gripping surface of the first drum collet and effectively true and grip the outer peripheral surface of said first end of the hollow tube inserted therein;

first supporting means cooperating with said first gripping means for supporting the first end bell concentric with said first end of the hollow tube; and first positioning means cooperating with said first supporting means and said first gripping means for selectively positioning the first end bell at a predetermined axial location relative said first end of the hollow tube.

16. The apparatus of claim 15, wherein the first end bell has a central aperture extending therethrough; and said first supporting means comprises a first actuating member with corresponding first actuating means, and a first end bell collet with an outer support surface corresponding to said central aperture and an inner camming surface adapted to receive the first actuating member, said first actuating means selectively engaging the first actuating member with said inner camming surface to expand the outer support surface of the first end bell collet into engagement with the said central aperture; wherein said actuating means comprises a first shaft fixed to and extending from the first actuating member, the first shaft being slidably mounted and extending through the axial center of both the first end bell collet and said first gripping means to concentrically align the first end bell with the cross-section of the hollow tube; and a first actuating solenoid cooperating with the first shaft to selectively engage and disengage the actuating member with the first end bell collet; and said first positioning means includes an independently slidable first sleeve through which the first shaft is slidably mounted, the first sleeve being concentric and cooperating with said first gripping means to selectively position the axial location of the first end bell relative said first end of the hollow tube.

17. The apparatus of claim 16, wherein flowable attaching means is applied to said first end of the hollow tube prior to mounting of the first end bell thereon; and the first assembly fixture head further having means for curing said flowable attaching means while the first end bell is held concentric with the cross-section of the hollow tube by said supporting means, and at said predetermined axial location relative said first end of the hollow tube by said positioning means.

18. The apparatus of claim 16, wherein the first assembly fixture head further comprises means for applying flowable attaching means between said first end of the hollow tube and the first end bell, the first end bell being held concentric with the cross-section of the hollow tube by said supporting means and at said predetermined axial location relative said first end by said positioning means until said flowable attaching means cures.

19. A method for precision assembly of a drum, such as a photoreceptor drum, wherein the drum to be assembled has a predetermined axial length and includes a hollow tube and a first end bell of corresponding shape to be concentrically mounted on a first end of the hollow tube, the method comprising the steps of:

gripping the outer peripheral surface of said first end of the hollow tube with sufficient uniform force, thereby truing the cross-section of the hollow tube;

locating a reference location representing an extreme distal end of the drum to be assembled opposite said first end of the hollow tube;

supporting the first end bell concentric with said first end of the hollow tube;

positioning the first end bell at said predetermined axial length from said reference location; and fixing the first end bell to said first end while said first end bell is held concentric with the cross-section of the hollow tube at said predetermined axial length relative said reference location.

20. The method of claim 19, wherein the step of locating said reference location comprises the steps of:

gripping the outer peripheral surface of said second end of the hollow tube with sufficient uniform force, thereby truing the cross-section of the hollow tube;

supporting the second end bell concentric with said second end of the hollow tube;

positioning the second end bell at said predetermined axial length relative the first end bell; and fixing the second end bell to said second end of the hollow tube while the second end bell is held concentric with the cross-section of the hollow tube at said predetermined axial length relative the first end bell.

* * * * *